US 11,427,436 B2

(12) United States Patent
Koskinen et al.

(10) Patent No.: US 11,427,436 B2
(45) Date of Patent: Aug. 30, 2022

(54) RESETTING DEVICE FOR RESETTING AN ACTUATOR FOR ACTUATING A SAFETY GEAR OF AN ELEVATOR

(71) Applicant: KONE Corporation, Helsinki (FI)

(72) Inventors: Antti Koskinen, Helsinki (FI); Pekka Hallikainen, Helsinki (FI); Antti I. Mäki, Helsinki (FI); Petri Hartikainen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 423 days.

(21) Appl. No.: 16/374,956

(22) Filed: Apr. 4, 2019

(65) Prior Publication Data
US 2019/0308846 A1 Oct. 10, 2019

(30) Foreign Application Priority Data

Apr. 6, 2018 (EP) ..................... 18166112

(51) Int. Cl.
*B60T 13/04* (2006.01)
*B66B 5/18* (2006.01)
*F16D 59/02* (2006.01)
*B66B 5/00* (2006.01)
*F16D 121/22* (2012.01)

(52) U.S. Cl.
CPC .............. *B66B 5/18* (2013.01); *B66B 5/0087* (2013.01); *F16D 59/02* (2013.01); *F16D 2121/22* (2013.01)

(58) Field of Classification Search
CPC .. F16D 59/02; F16D 2121/22; F16D 2121/26; F16D 2121/30; F16D 2127/02; F16D 2127/10; F16D 2125/66; B66B 1/32; B66B 5/16; B66B 5/22
See application file for complete search history.

(56) References Cited

U.S. PATENT DOCUMENTS 3,219,155 A * 11/1965 Kohli .................. F16D 65/28
188/171
5,370,208 A * 12/1994 De Jong ................. B66B 5/22
187/372
6,371,261 B1 * 4/2002 Thompson .............. B66B 5/22
187/370

(Continued)

FOREIGN PATENT DOCUMENTS

CN 1705137 A 6/2006
CN 102791604 A 11/2012
(Continued)

OTHER PUBLICATIONS

Search Report issued in European Patent Application No. 18166112. 5, dated Nov. 26, 2018.

*Primary Examiner* — Nicholas J Lane
(74) *Attorney, Agent, or Firm* — Birch, Stewart, Kolasch & Birch, LLP

(57) ABSTRACT

A resetting device for resetting an actuator for actuating a safety gear of an elevator includes an actuation spring to be brought into a compressed state by a resetting force, an electric motor for providing the resetting force and a transmission for transmitting the resetting force of the electric motor to the actuation spring. The transmission provides a positive gear ratio.

17 Claims, 8 Drawing Sheets

(56) References Cited

U.S. PATENT DOCUMENTS

| | | | |
|---|---|---|---|
| 8,631,909 B2* | 1/2014 | Draper | B66B 5/06 |
| | | | 187/373 |
| 2007/0051563 A1* | 3/2007 | Oh | B66B 5/06 |
| | | | 187/371 |
| 2007/0170010 A1 | 7/2007 | Higashinaka | |
| 2011/0226560 A1 | 9/2011 | Husmann | |
| 2014/0326544 A1* | 11/2014 | Husmann | F16D 65/28 |
| | | | 187/359 |
| 2015/0203079 A1* | 7/2015 | Sekiguchi | F16H 25/125 |
| | | | 188/72.1 |

FOREIGN PATENT DOCUMENTS

| | | |
|---|---|---|
| CN | 207175130 U | 4/2016 |
| JP | 2009-227353 A | 10/2009 |

\* cited by examiner

# RESETTING DEVICE FOR RESETTING AN ACTUATOR FOR ACTUATING A SAFETY GEAR OF AN ELEVATOR

FIELD OF THE INVENTION

The present invention relates to a resetting device for resetting an actuator for actuating a safety gear of an elevator.

RELATED BACKGROUND ART

A conventional elevator comprises a safety gear mounted to the elevator car or to the counterweight (moving mass) and the safety gear is activated by an overspeed governor system when the speed of the moving mass exceeds a predetermined tripping or activation speed which is above a rated speed of the elevator. A ropeless overspeed governor system comprises an actuator having an actuation lever which acts on the safety gear and which is connected to a synchronization rod being urged by an actuation spring in a direction to actuate the safety gear via the actuation lever. In the un-activated state of the actuator, the actuation lever is held by a holding magnet against the urging force of the actuation spring. When the holding magnet is de-energized, the actuation lever is no longer held by the holding magnet such that the actuation spring will act to push the synchronization rod which in turn makes the actuation lever turn in a manner to activate the safety gear. As a result, the elevator is stopped by engagement between the safety gear and a guide rail mounted in the elevator shaft. When the elevator is brought into a state of being able to travel again, the actuator needs to be brought back into the un-activated state by means of a resetting device which involves compressing the actuation spring. Compared to an overspeed governor system tripped by a rope, in the ropeless overspeed governor system, the actuation spring needs to be stronger and thus a higher force is required to compress the actuation spring for resetting the actuator.

Conventional resetting devices comprise a lever for compressing the actuation spring and the lever is moved by a linear motor. For example, according to US 2011/0226560 A1, an actuation lever 33 is connected to a spring seat, a synchronization rod 40 and a resetting lever 43. A holding magnet 35 and a tiltable holding device 34 are mounted to the resetting lever 43. In the un-activated state, a spring 32 is compressed between the above-mentioned spring seat and another spring seat 31, and the holding device 34 is engaged with a catch 34a of the actuation lever 33 and is held by the holding magnet 35. The resetting lever 43 is further connected to a spindle drive having an electric motor 39. When the safety gear is to be activated, the holding magnet 35 is de-energized and releases the holding device 34 such that the movement of the actuation lever 33 is allowed and the spring 32 pushes the actuation lever 33.

So as to reset the actuator, the electric motor 39 is operated so as to move the holding magnet 35 and the holding device 34 toward the catch 34a. When the holding device 34 is in a position ready for engagement with the catch 43a, the holding magnet is activated such that the catch 43a and the holding device 34 are engaged. Then, the electric motor 39 is operated in the reverse direction so as to bring the actuation lever 34 back into the un-activated position against the compression force of the spring 32.

The use of the spindle drive, which is a linear actuator, has the disadvantage that the force levels during resetting the actuator is very high so that a support portion for supporting the linear actuator easily bends which causes unwanted stresses and displacements for the device. Furthermore, since these high force levels have to be provided by an electric motor, the electric motor needs to be large.

It is thus the object of the present invention to provide an improved resetting device for resetting an actuator spring of an actuator for actuating a safety gear of an elevator, wherein the size of the electric motor can be reduced and the unwanted stresses and displacements due to bending of the motor support can be avoided.

According to the present invention, the above object is solved with a resetting device having the features of claim 1. Preferable embodiments are laid down in the sub-claims.

With the resetting device according to claim 1, an actuation spring is brought into the compressed state by driving an electric motor which provides a resetting force. A transmission means transmits the resetting force to the compression spring with a positive gear ratio. Hence, even if the torque provided by the electric motor is small, a sufficient resetting force can be applied to the actuation spring. This allows to use a small electric motor which is very cost efficient. In addition, the torque provided by the electric motor, which is received by the frame or by a motor support, is also comparatively small such that unwanted stresses and displacements due to bending of the motor support can be avoided.

According to claim 2, an interruption means can interrupt the transmission of forces between the electric motor and the actuation spring in a state in which the actuation spring is reset. Hence, when the actuation spring is reset and loaded, it is no longer necessary to apply a force to the actuation spring by the electric motor such that the transmission of forces can be interrupted. Further, when the actuator is activated and the compression force of the actuation spring is applied to the safety gear, this compression force is not applied to the electric motor. As a result, the electric motor does not hinder the movement of the actuator such that the safety gear can be quickly and reliably operated.

According to claim 3, a holding magnet for holding an actuation lever in an un-activated position, wherein the actuation lever is operatively connected to the safety gear, is preferably fixed to the frame. The holding magnet reliably holds the actuation lever even when the transmission of forces between the electric motor and the actuation spring is interrupted. Hence, since the holding magnet is fixed to the frame and does not need to be held by the electric motor, it is possible to interrupt the transmission of forces between the actuation spring and the electric motor. This allows switching off the electric motor after resetting of the actuator is finished.

According to claim 4, by attaching the first spring seat to the already existing synchronizing rod, it is not necessary to provide an additional member for supporting the actuation spring. Further, the controller allows a simple operation of the actuator.

According to claim 5, the interruption means is preferably an electromagnetic clutch provided between the electric motor and the actuation lever. The electromagnetic clutch can be suitable mounted to the actuator and allows quick and reliable interruption of the transmission of forces between electric motor and actuation spring.

According to claim 6, the electromagnetic clutch is preferably disengaged when no electricity is supplied. Hence, even during power breakdown, the electric motor is decoupled from the actuator such that activation of the safety gear is not hindered by the electric motor.

The double gear mechanism according to claim 7 allows providing a large gear ratio between the output shaft and the input shaft of the transmission means such that the electric motor can be designed to provide a small torque.

Also the planetary gear set according to claim 8 allows providing a large gear ratio between the ring gear and the carrier such that the electric motor can be designed to provide a small torque. Forming the transmission means as a planetary gear set allows to have a robust and compact transmission means.

With the brake according to claim 9, it is possible to implement the interruption means in combination with the planetary gear set in a cost efficient manner. Preferably, the planetary gear set can be designed to provide a small gear ratio between the ring gear and the sun gear such that the counter torque acting on the sun gear, which is generated during operation of the electric motor when compressing the actuation spring and is a counter torque to the motor torque applied to the carrier, is small. Furthermore, the provision of the brake disc allows to brake this small torque of the sun gear with a small brake force in accordance with the diameter of the brake disc. As a result, the brake can be designed to be small which allows a cost efficient solution.

According to claim 10, in an optional configuration of the transmission means, the sun gear is connected to the electric motor. The planetary gear set according to claim 10 allows providing a large gear ratio between the carrier and the ring gear such that the electric motor can be designed to provide a small torque. Forming the transmission means as a planetary gear set allows to have a robust and compact transmission means.

According to claim 11, in an optional configuration of the transmission means, the carrier is connected to the brake disc. According to this configuration, it is possible to implement the interruption means in combination with the planetary gear set in a cost efficient manner. Preferably, the planetary gear set can be designed to provide a small gear ratio between the ring gear and the sun gear such that the counter torque acting on the carrier, which is generated during operation of the electric motor when compressing the actuation spring and is a counter torque to the motor torque applied to the sun gear, is small. Furthermore, the provision of the brake disc allows to brake this small torque of the sun gear with a small brake force in accordance with the diameter of the brake disc. As a result, the brake can be designed to be small which allows a cost efficient solution.

According to claim 12, the brake is not operated when no electricity is supplied. Hence, even during power breakdown, the electric motor is decoupled from the actuator such that activation of the safety gear is not hindered by the electric motor.

The planetary gear set according to claim 13 allows providing a large gear ratio between the output shaft and the input shaft of the transmission means such that the electric motor can be designed to provide a small torque.

With the safety gear according to claim 14, when the brake wedge is actuated by the actuation lever, the brake wedge moves along the counter wedge and the counter wedge moves along the guide surface. Due to the inclined lateral sides of the brake wedge and the counter wedge, the brake wedge is pressed laterally inward such that the brake wedge acts on the elevator guide rail to generated a braking force. Preferably, the brake wedge comprises a friction surface which acts of the elevator guide rail so as to generated the braking force.

With the safety gear according to claim 15, when the brake wedge is activated by the actuation lever, the counter wedge is pressed against the counter spring. As a result, the counter wedge is moved to a smaller amount than the brake wedge which contributes to that the brake wedge is pressed laterally inward against the elevator guide rail such that the brake force is reliably generated. Furthermore, when the actuation of the safety gear is released after the stop of the elevator car, the compression spring applies a pressing force to the counter wedge so that the counter wedge is pressed back into its initial position. As a result, the brake wedge can reliably be released from the elevator guide rail such that the safety gear is reliably released.

DESCRIPTION OF THE EMBODIMENTS

These and other objects, features, details and advantages will become more fully apparent from the following detailed description of embodiments of the present invention which is to be taken in conjunction with the appended drawings, in which.

First Embodiment

Figure 1A:
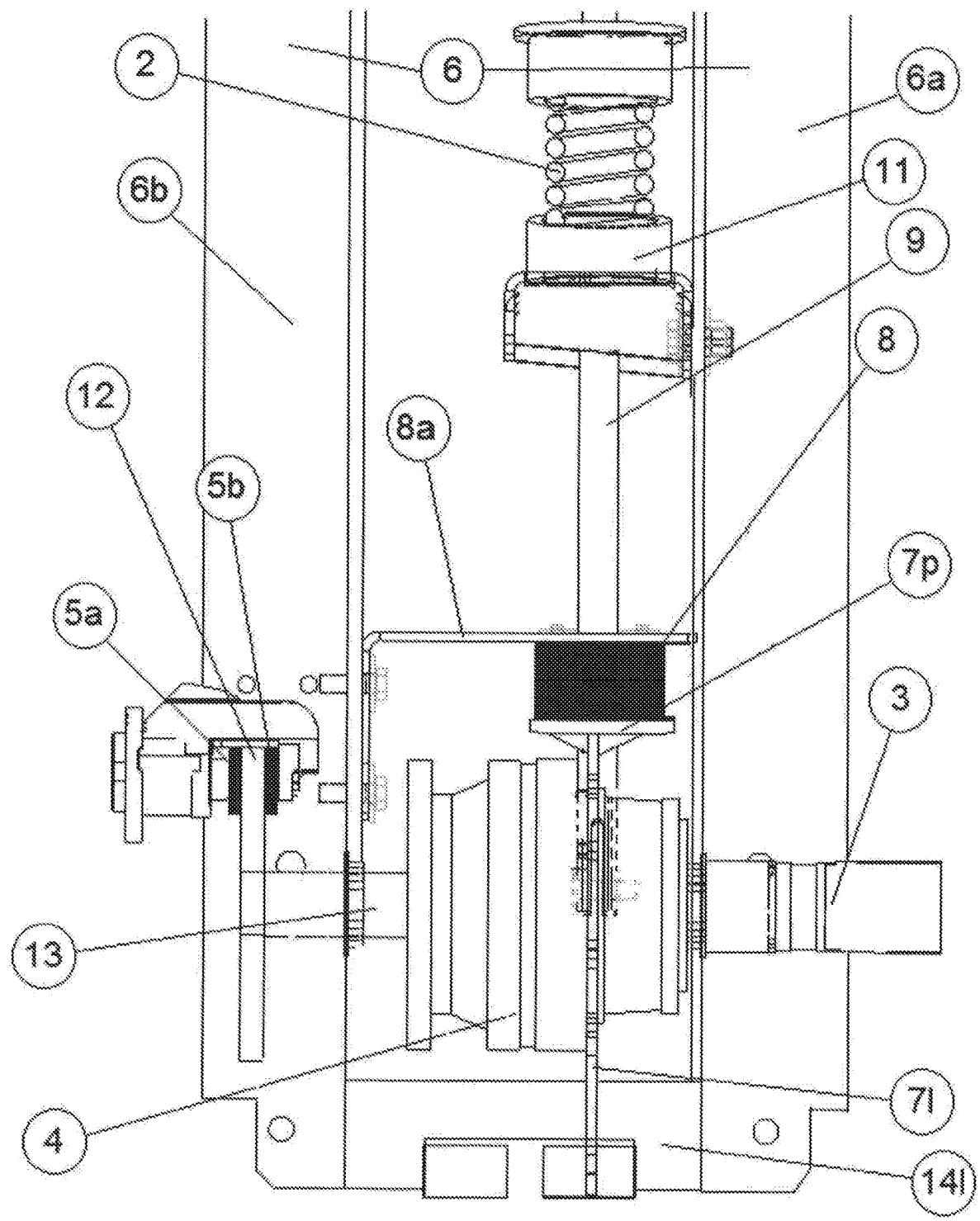
FIG. 1A is a top view of a resetting device according to a first embodiment of the present invention.
Figure 1B:
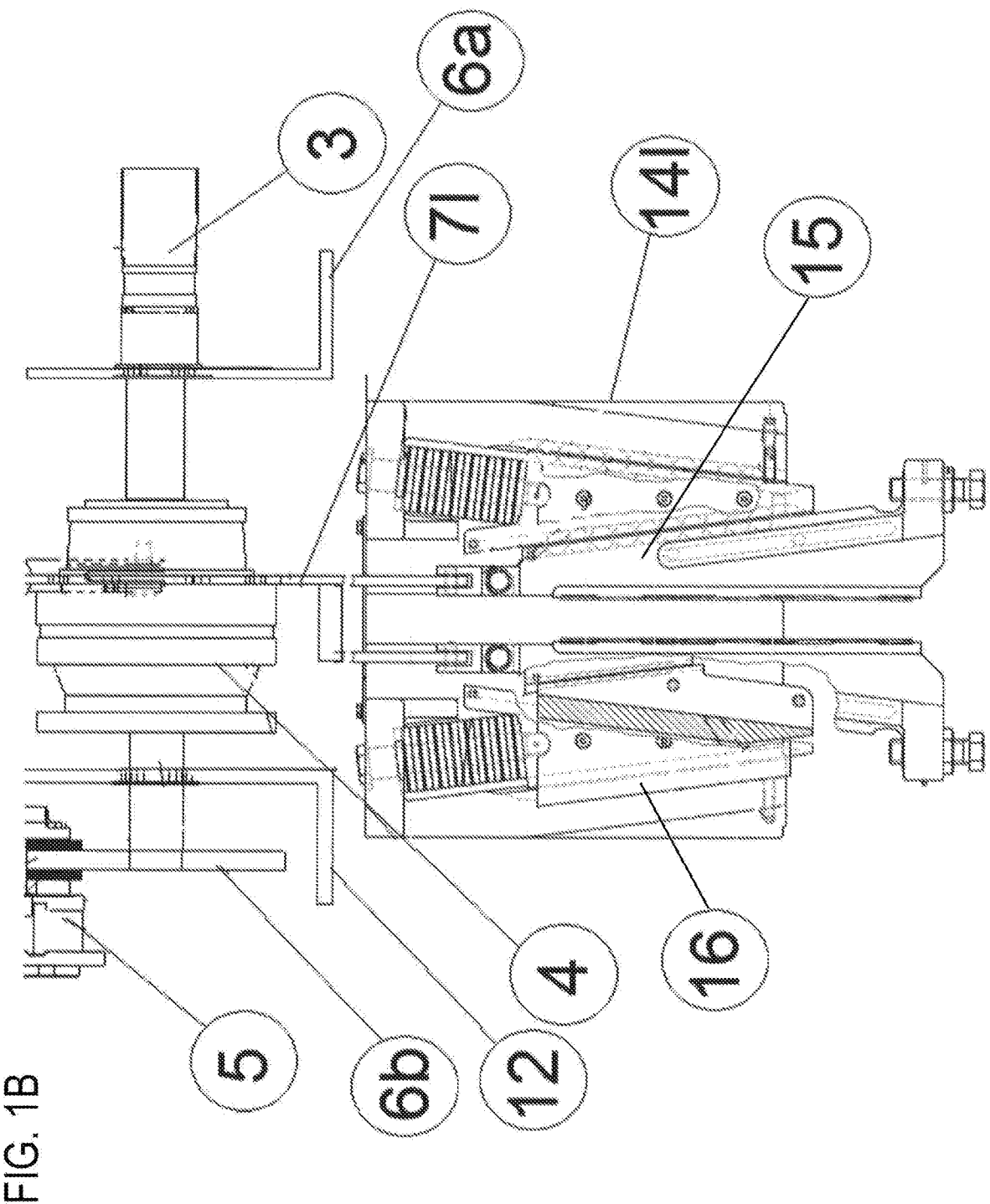
FIG. 1B is a front view of the resetting device according to the first embodiment.
Figure 2:
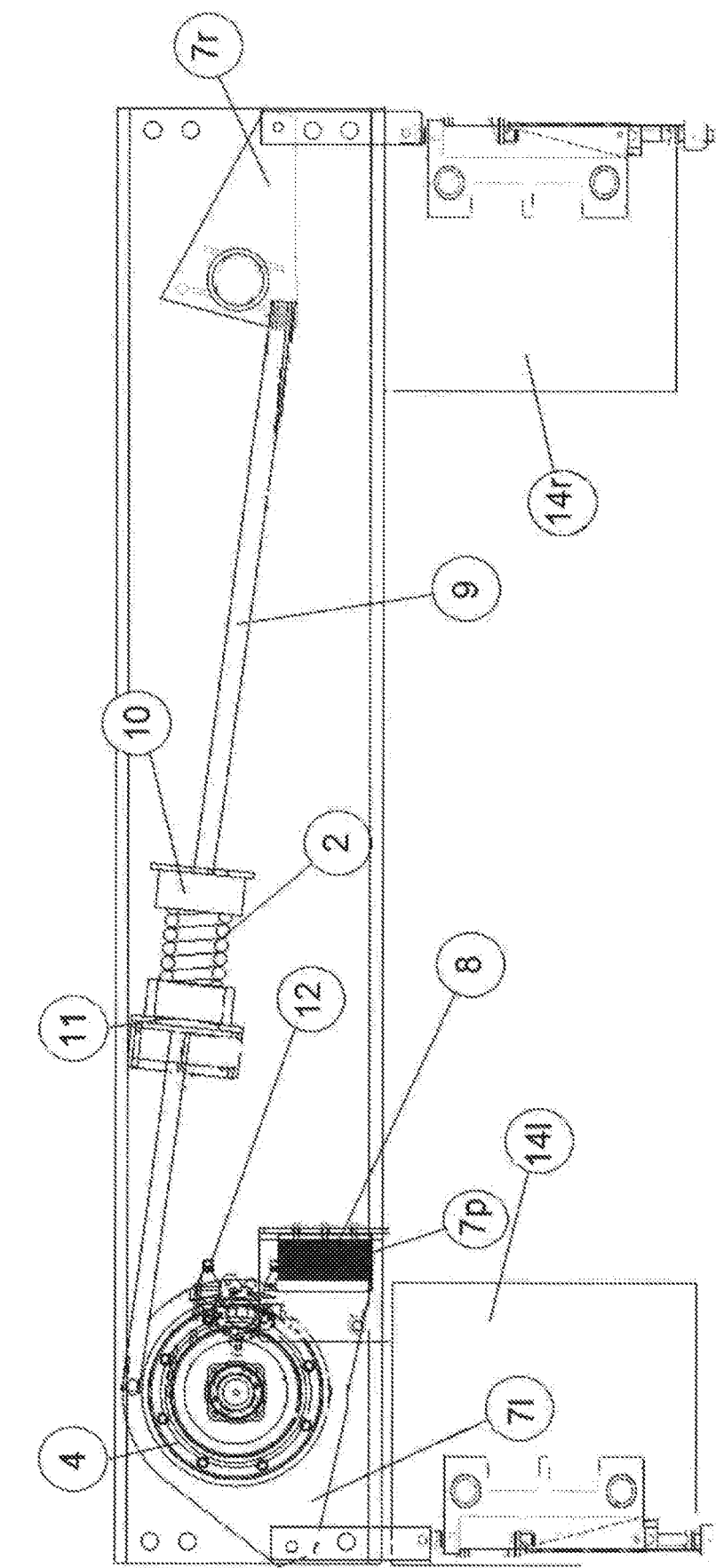
FIG. 2 is a side view of the resetting device according to the first embodiment.

FIGS. 1A, 1B and 2 show an actuator having a resetting device 1 according to a first embodiment the invention. The actuator comprises a frame 6 which is provided on the bottom of an elevator car (not shown) or a counterweight (not shown). The frame 6 comprises two adjacent beams 6a, 6b which are mounted to the elevator car/counterweight at their upper sides, and which are connected to safety gears 14l, 14r on their lower sides on both longitudinal ends of the frame 6. The safety gears 14l, 14r are configured to engage with a guide rail (not shown) provided in an elevator shaft in which the elevator travels. The safety gears 14l, 14r comprise braking wedges 15 which, when being pulled up, are clamped between respective counter wedges 16 of the safety gears 14l, 14r and the guide rail so as to brake the elevator car/counterweight. The braking wedges 15 are pulled up by actuation levers 7l, 7r which are mounted between the beams 6a, 6b of the frame 6 in a manner to be rotatable about shafts. In more detail, when the left actuator lever 7l rotates in the clockwise direction in FIG. 2, the brake wedges 15 of the left safety gear 14l are pulled upward in FIG. 1B so as to be clamped between the counter wedges 16 and the guide rail. Further, when the right actuator lever 7r rotates in the counterclockwise direction, the brake wedges of the right safety gear 14r are pulled upward so as to be clamped between the counter wedges and the guide rail. In other words, the actuation levers 7l, 7r are operatively connected to the safety gears 14l, 14r.

The actuation levers 7l, 7r are connected to each other by a synchronizing rod 9. A first spring seat 10 is mounted to the outer circumference of the synchronizing rod 9 and a second spring seat 11 is mounted to the beam 6a in a manner that the synchronizing rod 9 penetrates the second spring seat 11. An actuation spring 2 is seated between the first and second spring seat 10, 11 and is formed as a coil spring, wherein the synchronizing rod 9 passes through the inner space of the coil spring.

As can be seen in FIG. 2, the left end of the synchronizing rod 9 is attached to an upper portion of the left actuation lever 7l, and the right end of the synchronizing rod 9 is connected to a lower portion of the right actuation lever 7r. Hence, when the synchronizing rod 9 is moved to the right side in FIG. 2, the left actuation lever 7l is rotated in the clockwise direction and the right actuation lever 7r is rotated in the counterclockwise direction.

Now, the resetting device 1 according to the present embodiment is described in detail. The resetting device 1 comprises an electric motor 3, a planetary gear set 4, a brake shaft 13, a brake disc 12, and a brake 5. The electric motor 3 is mounted to the outer surface of the beam 6a and the brake 5 is mounted to the outer surface of the beam 6b. The planetary gear set 4 is arranged between the two beams 6a, 6b and comprises a sun gear (not shown) with external teeth, a ring gear (not shown) with internal teeth and a carrier (not shown) with a plurality of planetary gears in mesh with the sun gear and the ring gear. A motor shaft of the electric motor 3 penetrates the beam 6a and is connected to the carrier of the planetary gear set 4. The brake shaft 13 penetrates the other beam 6b and is connected to the sun gear of the planetary gear set 4 between the beams 6a, 6b, and the brake disc 12 is attached to the brake shaft 13 on the outside of the beam 6b. The left actuation lever 7l is attached to the outer circumference of the ring gear. The brake 5 is attached to the beam 6b at a position where brake shoes 5a, 5b can act on the brake disc 12 so as to brake the rotational movement of the brake disc 12.

In the planetary gear set 4, the gear ratio between the ring gear, i.e. the output of torque, and the carrier, i.e. the input of torque from the electric motor, is as large as possible. As a result, the input torque provided by the electric motor 3 can be small such that the electric motor 3 can be designed small. Further, the gear ratio between the ring gear and the sun gear is as small as possible. As a result, the torque to be applied to the sun gear so as to hold the sun gear stationary for allowing transmission of the input torque from the electric motor 3 to the ring gear, which applies a large torque to the actuation lever 7l, can be small. Hence, the brake 5 can be designed to be small.

The left actuation lever 7l comprises a holding plate (magnet armature) 7p at a position on the lower right side of the left actuation lever 7l in FIG. 2. Further, a holding magnet 8 is attached to the inner surface of the beam 6b via a holding bracket 8a and thus between the beams 6a, 6b. The holding magnet 8 is provided at a position at which the holding plate 7p is in surface contact with the holding magnet 8 when the left actuation lever 7l is in the un-activated state. Thus, when holding magnet 8 is energized, the left actuation lever 7l is held in the un-activated state by the holding magnet 8.

Now, the operation of the actuator of this embodiment will be described. FIG. 2 shows the un-activated state of the actuator in which the safety gears 7l, 7r are not activated. In the un-activated state, the brake 5 is not operated such that the brake disc 12 and hence the sun gear of the planetary gear set 4 can freely rotate. When a ropeless overspeed governor (non shown) indicates that the elevator travel speed exceeds an predetermined tripping or activation speed at which the movement of the elevator car or the counterweight must be stopped, the holding magnet 8 is de-energized by a control unit (not shown). As a result, the left actuation lever 7l is free to rotate and the actuation spring 2 is no longer held in the compressed state. Hence, the actuation spring 2 pushes the first spring seat 10 to the right side together with the synchronization lever 9 such that the left actuation lever 7l is rotated in the clockwise direction and the right actuation lever 7r is rotated in the counterclockwise direction. As has been described above, the rotations of the actuation levers 7l, 7r pull the brake wedges of the safety gears upward such that the elevator car/counterweight is braked at the guide rail.

Since the brake 5 is not operated and the sun gear is free to rotate, the rotation of the ring gear connected to the left actuation lever 7l is not transmitted to the planetary gears such that the rotation of the left actuation lever 7l is not hindered by the electric motor 3.

So as to reset the actuator, the brake 5 is operated such that the brake disc 12 is held stationary with respect to the frame 6. As a result, the sun gear is held stationary, i.e. the sun gear cannot rotate. Hence, the rotation of the carrier connected to the motor shaft of the electric motor 3 can be transmitted to the ring gear connected to the left actuation lever 7l. Next, the electric motor 3 is operated in a direction to rotate the ring gear of the planetary gear set 4 and thus the left actuation lever 7l in the counterclockwise direction. During this rotational movement of the left actuation lever 7l, the synchronization rod 9 connected to the upper portion of the left actuation lever 7l is moved to the left side against the spring force of the actuation spring 2. As a result, the actuation spring 2 is compressed. When the holding plate 7p comes into contact with the holding magnet 8, the holding magnet 8 is energized and thus holds the left actuation lever 7l against the spring force of the actuation spring 2. Then, the electric motor 3 and the brake 5 are de-energized. Now, resetting of the actuator is finished.

Second Embodiment

Figure 3A:
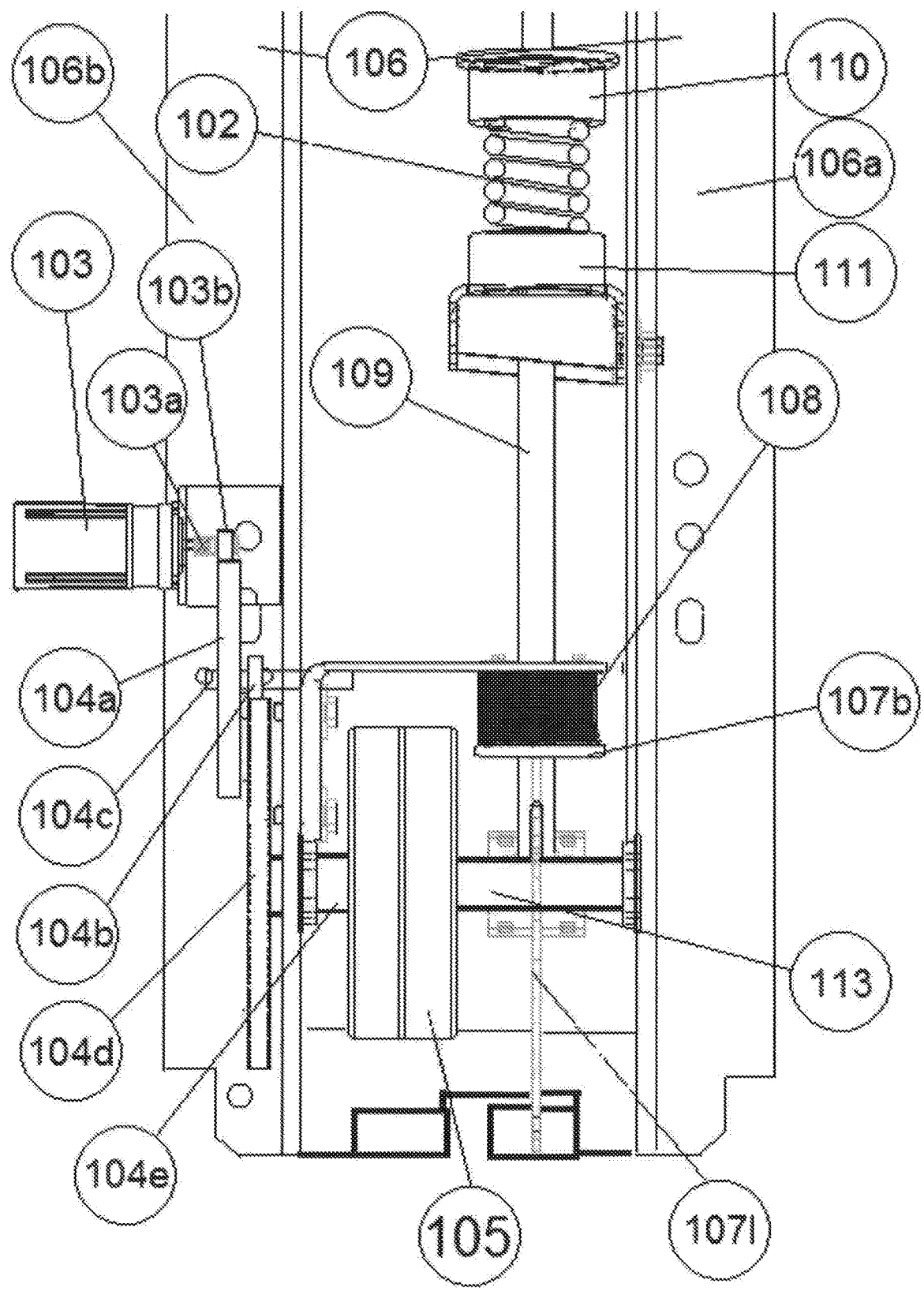
FIG. 3A is a top view of a resetting device according to a second embodiment of the present invention.
Figure 3B:
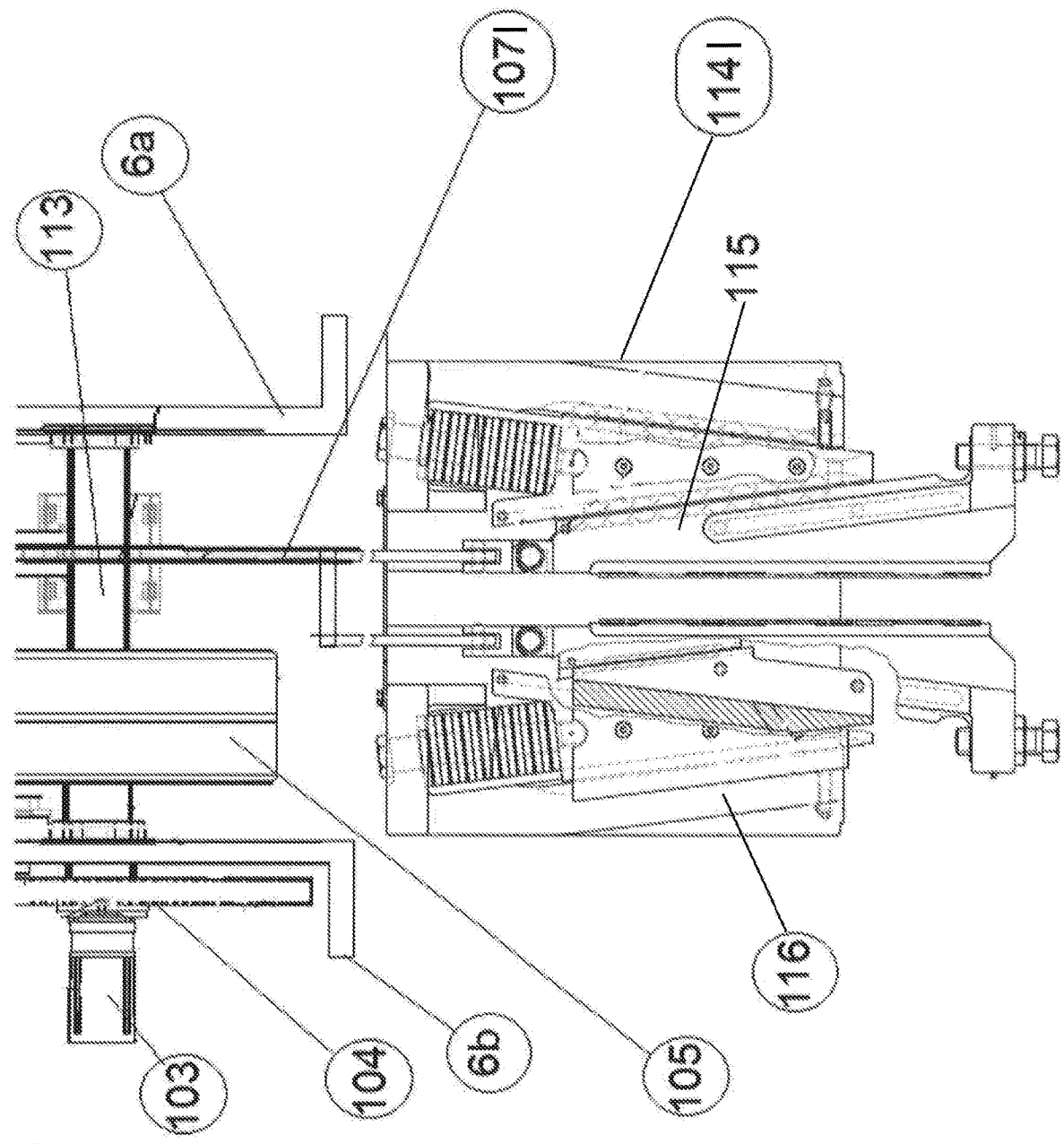
FIG. 3B is a front view of the resetting device according to the second embodiment.
Figure 4:
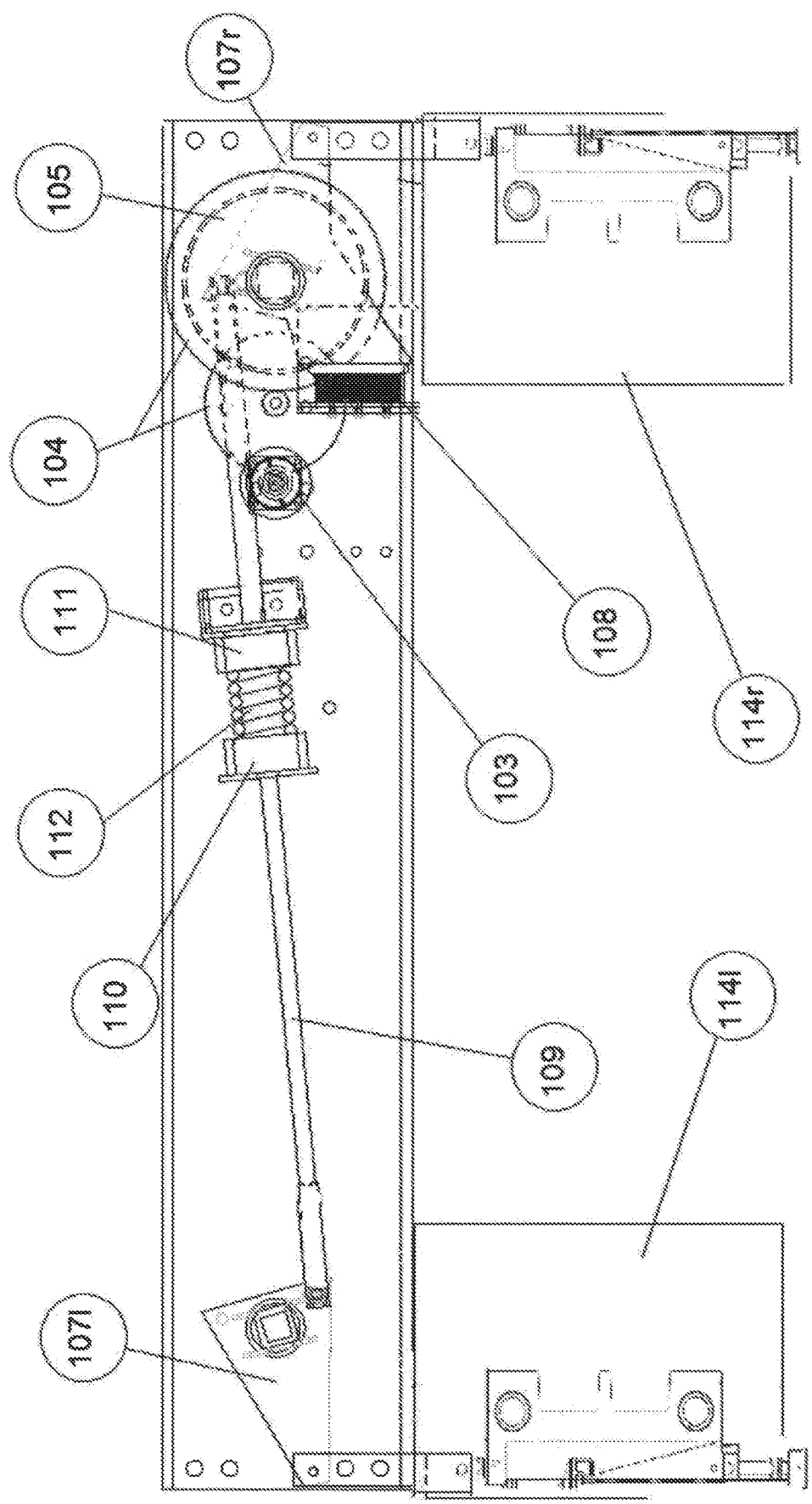
FIG. 4 is a side view of the resetting device according to the second embodiment.

FIGS. 3A, 3B and 4 show an actuator having a resetting device 101 according to a second embodiment the invention. The actuator comprises a frame 106 which is provided on the bottom of an elevator car (not shown) or a counterweight (not shown). The frame 106 comprises two adjacent beams 106a, 106b which are mounted to the elevator car/counterweight at their upper side, and which are connected to safety gears 114l, 114r on their lower side on both longitudinal ends of the frame 106. The safety gears 114l, 114r are configured to engage with a guide rail (not shown) provided in an elevator shaft. The safety gears 114l, 114r comprise brake wedges 115 which, when being pulled up in FIG. 3B, are clamped between respective counter wedges 116 of the safety gears 114l, 114r and the guide rail so as to brake the elevator car/counterweight. The brake wedges 115 are pulled up by actuation levers 107l, 107r which are mounted to the beams 106a, 106b of the frame 106 in a manner to be rotatable about shafts. In more detail, when the left actuator lever 107l rotates in the clockwise direction in FIG. 4, the brake wedges 115 of the left safety gear 114l are pulled upward in FIG. 3B so as to be clamped between the counter wedges 116 and the guide rail. Further, when the right actuator lever 107r rotates in the counterclockwise direction, the brake wedges 115 of the right safety gear 114r are pulled upward so as to be clamped between the counter wedges and the guide rail. In other words, the actuation levers 107l, 107r are operatively connected to the safety levers 114l, 114r.

Making reference to FIG. 4, the actuation levers 107*l*, 107*r* are connected to each other by a synchronizing rod 109. A first spring seat 110 is mounted to the outer circumference of the synchronizing rod 109 and a second spring seat 111 is mounted to the beam 106*a* in a manner that the synchronizing rod 109 penetrates the second spring seat 111. An actuation spring 2 is seated between the first and second spring seat 110, 111 and is formed as a coil spring, wherein the synchronizing rod 109 passes through the inner space of the coil spring.

As can be seen in FIG. 4, the left end of the synchronizing rod 109 is attached to a lower portion of the left actuation lever 107*l*, and the right end of the synchronizing rod 109 is connected to an upper portion of the right actuation lever 107*r*. Hence, when the synchronizing rod 109 is moved to the left side in FIG. 4, the left actuation lever 107*l* is rotated in the clockwise direction and the right actuation lever 107*r* is rotated in the counterclockwise direction.

Now, the resetting device 101 according to the present embodiment is described in detail. The resetting device 101 comprises an electric motor 103, a double gear mechanism 104, a driven shaft 113, and an electro-magnetic clutch 105.

The electric motor 103 is attached to the outer surface of the beam 106*b* and comprises a motor shaft 103*a* provided with a drive pinion 103*b*.

The double gear mechanism 104 is provided outside the beam 106*b* and comprises a first gear 104*a* and a second gear 104*b* which are provided on a common first transmission shaft 104*c* which is rotatably attached to the beam 106*b* via a bearing. The first gear 104*a* has a larger diameter than that of the drive pinion 103*b* and that of the second gear 104*b*. Further, the first gear 104*a* is in mesh with the drive pinion 103*b*.

The double gear mechanism 104 further comprises a third gear 104*d* which is attached to a second transmission shaft 104*e* and which is in mesh with the second gear 104*b*. The second transmission shaft 104*e* is supported by the beam 106*b* and is connected to an electromagnetic clutch 105.

The electromagnetic clutch 105 is provided between the double gear mechanism 104 and the right actuation lever 114*r* and is connected to the second transmission shaft 104*e* as well as to the driven shaft 113 to which the right actuation lever 114*r* is attached. When the electro-magnetic clutch 105 is engaged, the rotation of the second transmission shaft 104*e* is transmitted to the driven shaft 113 and vice versa. When the electro-magnetic clutch 105 is disengaged, the rotation of the second transmission shaft 104*e* is not transmitted to the driven shaft 113 and vice versa. The electro-magnetic clutch 105 is configured to be engaged when supplied with electricity and to be disengaged when no electricity is supplied.

The right actuation lever 107*r* comprises a holding plate (magnet armature) 107*p* at a position on the lower left side of the right actuation lever 107*r* in FIG. 4. A holding magnet 108 is attached to the beam 106*a* at a position in which the holding plate 107*p* is in surface contact with the holding magnet 108 when the holding magnet 108 is energized.

Now, the operation of the actuator of this embodiment is described. FIG. 4 shows an un-activated state of the actuator in which the safety gears 107*l*, 107*r* are not activated. In the un-activated state, the electromagnetic clutch is not engaged such that the driven shaft 113 can freely rotate. When a ropeless overspeed governor (non shown) indicates that the elevator travel speed exceeds an predetermined tripping speed, the holding magnet 108 is de-energized by a control unit (not shown). As a result, the right actuation lever 107*r* is free to rotate and the actuation spring 102 is no longer held in the compressed state. Hence, the actuation spring 102 pushes the first spring seat 110 to the left side in FIG. 4 together with the synchronization lever 109 such that the right actuation lever 107*r* is rotated in the counterclockwise direction and the left actuation lever 107*l* is rotated in the clockwise direction. As has been described above, the rotations of the actuation levers 107*l*, 107*r* pull the brake wedges of the safety gears 114*r*, 114*l* upward such that the elevator car/counterweight is braked at the guide rail.

Since the electromagnetic clutch 105 is not operated, the rotation of the driven shaft 113 connected to the right actuation lever 107*r* is not transmitted to the second transmission shaft 104*e* such that the rotation of the right actuation lever 107*r* is not hindered by the electric motor 103.

So as to reset the actuator, the electro-magnetic clutch 105 is engaged such that the rotation of the second transmission shaft 104*e* can be transmitted to the driven shaft 113 connected to the right actuation lever 107*r*. Next, the electric motor 103 is operated in a direction to rotate the right actuation lever 107*r* in the clockwise direction in FIG. 4. During this rotation movement of the right actuation lever 107*r*, the synchronization rod 109 connected to the upper portion of the right actuation lever 107*r* is moved to the right side against the spring force of the actuation spring 102. As a result, the actuation spring 102 is compressed. When the holding plate 107*p* comes into contact with the holding magnet 108, the holding magnet 108 is energized and thus holds the right actuation lever 107*r* against the spring force of the actuation spring 102. Then, the electric motor 103 and the electro-magnetic clutch 105 are de-energized. Now, resetting of the actuator is finished.

Figure 5:
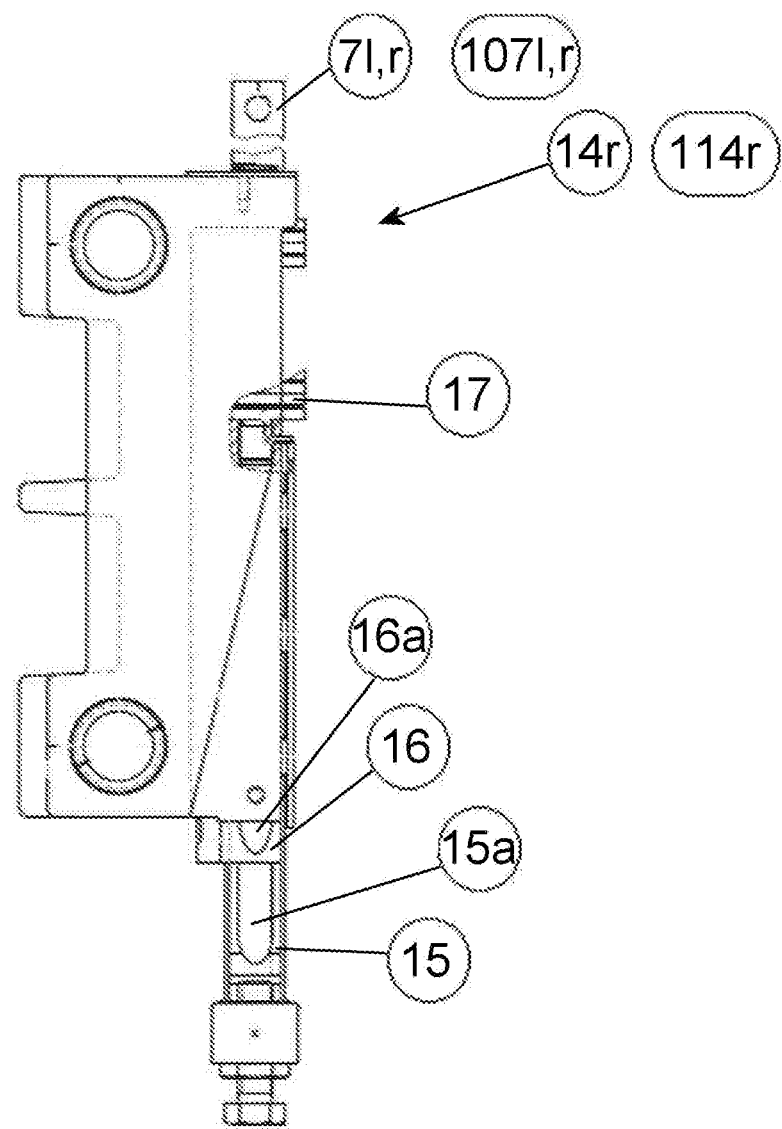
FIG. 5 is a side view of a safety gear according to the first and second embodiment.

Next, the safety gear 14*r, l*; 114*r, l* is described in more detail with reference to FIGS. 5 and 6.

Figure 6:
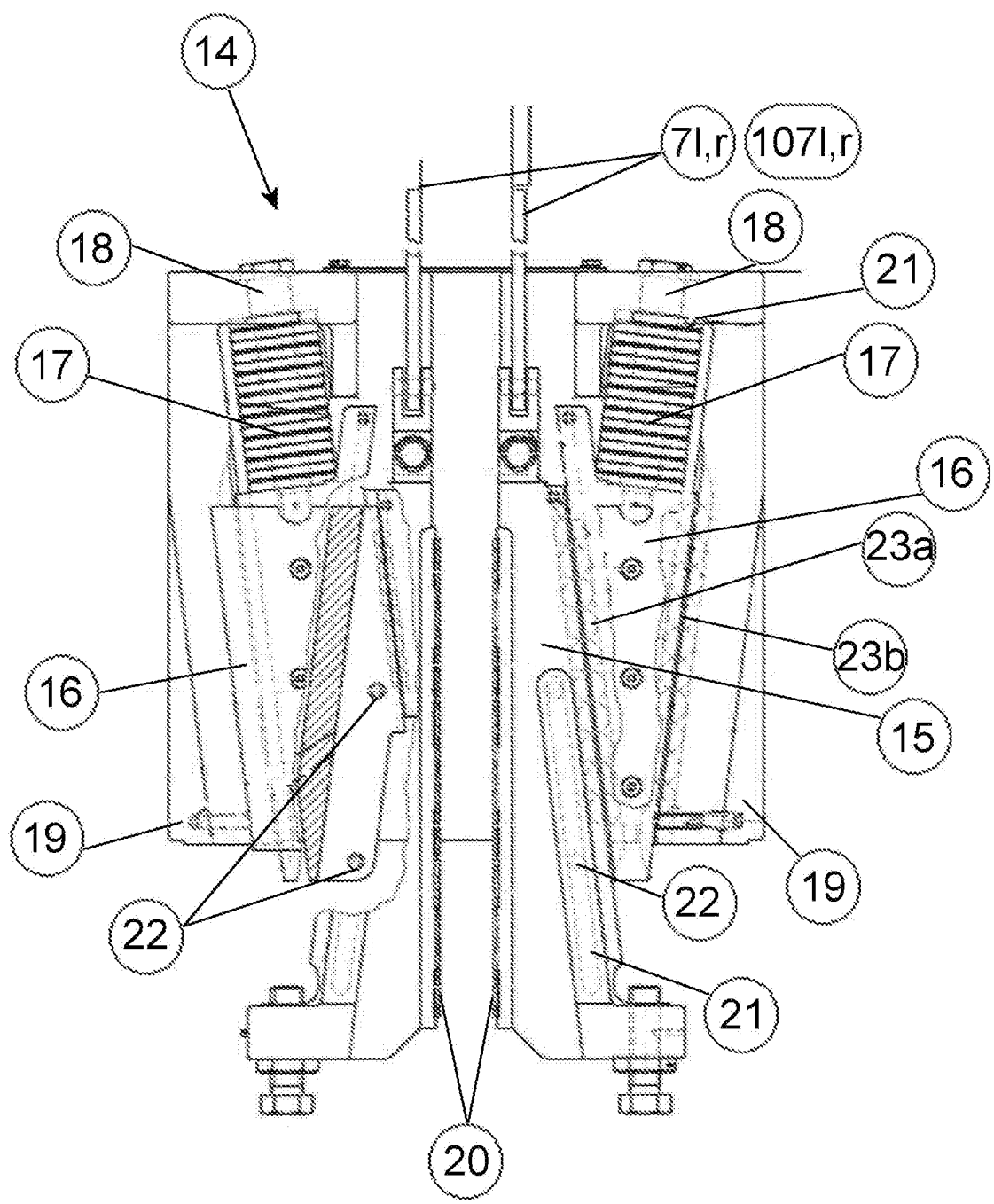
FIG. 6 is a front view of the safety gear shown in FIG. 5

As can be seen especially in FIG. 6, the safety gear 14*r, l*; 114*r, l* comprises a wedge chamber 19 for accommodating the brake wedges 15 and the counter wedges 16. Each brake wedge 15 comprises a guide groove 21 for guiding the brake wedge 15 with respect to guide pins 22 mounted to the wedge chamber 19. The upper ends of the brake wedges 15 are connected to the associated actuation levers 7*l, r* or 107*l, r*, respectively. In the front view of FIG. 6, the brake wedges 15 have a substantial triangular shape with an inner lateral side and an outer lateral side. This inner lateral side is oriented substantially vertical and comprises a friction surface 20 acting on the elevator guide rail when the safety gear 14*r, l*; 114*r, l* is activated. The outer lateral side of the brake wedge 15 is inclined with respect to the vertical direction and is formed with a groove 15*a* for accommodating balls 23*a*. The outer lateral side is inclined such that the upper end of the brake wedge 15 has a smaller width in the lateral direction than the lower end thereof.

The counter wedges 16 have a substantially triangular shape when seen in the front view of FIG. 6. The inner lateral side of the counter wedges 16 is substantially parallel to the outer lateral side of the adjacent brake wedge 15 and is formed with a groove for accommodating the balls 23*a* in common with groove 15*a* of the brake wedge 15. As a result, the brake wedge 15 and the counter wedge 16 can slide with respect to each other.

The outer lateral sides of the counter wedges 16 are inclined with respect to the vertical direction such that the lower end of the counter wedge 16 has a smaller width in the lateral direction than the upper end thereof. A groove 16*a* is formed in the outer lateral side of the counter wedge so as to accommodated balls 23*b* which are also accommodated in a groove of an inner lateral side of the wedge chamber 19, which is substantially parallel to the outer lateral side of the counter wedge 16. As a result, the counter wedge 16 can slide within the wedge chamber 19.

Compression springs 17 are connected to the upper ends of the counter wedges 16 and to the upper end of the wedge chamber 19, respectively, by means of retention screws 18. The compression springs 17 are oriented such that their spring forces act in parallel to the outer lateral side of the wedge 16 and the inner lateral side of the wedge chamber 19 which act as guide surfaces for the counter wedges 16.

When the safety gear 14r, l; 114r, l is activated by means of the actuation levers 7l, r or 107l, r, the brake wedges 15 are pulled upwardly to a larger extent than the counter wedges 16 are pressed against the compression springs 17. Due to the inclined lateral sides of the wedges 15, 16, the brake wedges 15 are pressed inwardly such that the friction surfaces 20 apply a braking force to the elevator guide rail due to which the elevator car is stopped.

After the stop, and after the actuation of the safety gear is released, the elevator car is raised with a hoisting machine such that the brake wedges 15 are moved in the opposite direction with respect to the counter wedges 16. At this time, the compression springs 17 apply a pressing force to the counter wedges 16 in the downward direction such that the brake wedges 15 and the counter wedges 16 are pressed back into their initial position.

The present invention is not limited to the above embodiments.

In the second embodiment, the electro-magnetic clutch is provided between the double gear mechanism and the actuation lever. However, the electric clutch can also be provided between the electric motor and the double gear mechanism.

The invention claimed is:

1. A resetting device for resetting an actuator for actuating a safety gear of an elevator, the resetting device comprising:
an actuation spring to be brought into a compressed state by a resetting force;
an electric motor for providing the resetting force;
a transmission for transmitting the resetting force of the electric motor to the actuation spring, wherein the transmission provides a positive gear ratio;
a frame;
an actuation lever rotatably mounted to the frame and operatively connected to the safety gear;
a synchronization rod connected to the actuation lever;
a first spring seat attached to the synchronization rod;
a second spring seat attached to the frame, wherein the actuation spring is seated between the first and second spring seat; and
a controller adapted to drive the electric motor until the actuation lever is brought into the un-activated position by the resetting force against a force of the actuation spring, then to activate a holding magnet so as to hold the actuation lever in the un-activated position, and then to activate an interruption mechanism so as to interrupt the transmission of force between the electric motor and the actuation spring.

2. The resetting device according to claim 1, wherein the interruption mechanism is configured to interrupt the transmission of force between the electric motor and the actuation spring in a state in which the actuation spring is reset.

3. The resetting device according to claim 1,
wherein the holding magnet is configured to hold the actuation lever in an un-activated position in which the actuation spring is reset and the safety gear is not activated, and wherein the holding magnet is fixed to the frame.

4. The resetting device according to claim 1, wherein the interruption mechanism is an electro-magnetic clutch provided between the electric motor and the actuation lever.

5. The resetting device according to claim 4, wherein the electro-magnetic clutch is adapted to interrupt the transmission of forces between the electric motor and the actuation spring when not being supplied with electricity.

6. The resetting device according to claim 4, wherein the transmission is a double gear mechanism adapted to transmit the resetting force from the electric motor to the electro-magnetic clutch with a positive gear ratio.

7. The resetting device according to claim 1, wherein the transmission is formed by a planetary gear set having a sun gear, a ring gear and a carrier carrying planetary gears in mesh with the sun gear and the ring gear, respectively,
wherein the ring gear is connected to the actuation lever, and
wherein the carrier is connected to the electric motor.

8. The resetting device according to claim 7, wherein the sun gear is connected to a brake disc, and the resetting device further comprises a brake for applying a brake force to the brake disc,
wherein the interruption mechanism is formed by the brake being in a state of not applying a brake force to the brake disc so as to allow the sun gear to rotate freely, thus interrupting the transmission of forces between the electric motor and the actuation spring.

9. The resetting device according to claim 1, wherein the transmission is formed by a planetary gear set having a sun gear, a ring gear and a carrier carrying planetary gears in mesh with the sun gear and the ring gear, respectively,
wherein the ring gear is connected to the actuation lever, and
wherein the sun gear is connected to the electric motor.

10. The resetting device according to claim 9, wherein the carrier is connected to a brake disc, and the resetting device further comprises a brake for applying a brake force to the brake disc,
wherein the interruption mechanism is formed by the brake being in a state of not applying a brake force to the brake disc so as to allow the sun gear to rotate freely, thus interrupting the transmission of forces between the electric motor and the actuation spring.

11. The resetting device according to claim 8, wherein the brake is adapted to be in the state of not applying the brake force to the brake disc when the brake is not supplied with electricity.

12. The resetting device according to claim 7, wherein the planetary gear set is adapted to transmit the resetting force from the electric motor to the actuation spring with a positive gear ratio.

13. The resetting device according to claim 1, wherein the safety gear comprises a wedge chamber and a brake wedge acting on an elevator guide rail and is activated by an actuation lever and counter wedge movable along guide surfaces provided in the wedge chamber.

14. The resetting device according to claim 13, wherein the safety gear is provided with pressure springs attached with fixing screws on one ends thereof to stop faces of the wedge chamber and by the other ends thereof to wider ends of the counter wedges.

15. The resetting device according to claim 2,
wherein the holding magnet is configured to hold the actuation lever in an un-activated position in which the actuation spring is reset and the safety gear is not activated, wherein the holding magnet is fixed to the frame.

16. The resetting device according to claim 2, wherein the interruption mechanism is an electro-magnetic clutch provided between the electric motor and the actuation lever.

17. The resetting device according to claim 3, wherein the interruption mechanism is an electro-magnetic clutch provided between the electric motor and the actuation lever.

\* \* \* \* \*